(12) United States Patent
Oruaas et al.

(10) Patent No.: US 8,711,841 B2
(45) Date of Patent: Apr. 29, 2014

(54) COMMUNICATION SYSTEM

(75) Inventors: Mart Oruaas, Dublin (IE); Sven Suursoho, Dublin (IE); Madis Kaal, Dublin (IE)

(73) Assignee: Skype, Dublin (IE)

( * ) Notice: Subject to any disclaimer, the term of this patent is extended or adjusted under 35 U.S.C. 154(b) by 930 days.

(21) Appl. No.: 11/986,985

(22) Filed: Nov. 27, 2007

(65) Prior Publication Data
US 2008/0192734 A1  Aug. 14, 2008

(30) Foreign Application Priority Data

Nov. 27, 2006 (GB) .................................. 0623622.8
Nov. 23, 2007 (GB) .................................. 0723123.6

(51) Int. Cl.
*H04L 12/66* (2006.01)
*H04L 12/56* (2011.01)
*H04L 12/16* (2006.01)

(52) U.S. Cl.
USPC ............................ 370/352; 370/401; 370/259

(58) Field of Classification Search
USPC .................. 370/352–356, 254, 259, 401, 402
See application file for complete search history.

(56) References Cited

U.S. PATENT DOCUMENTS

| | | | |
|---|---|---|---|
| 6,061,363 A | 5/2000 | Evans et al. | |
| 6,718,028 B2 | 4/2004 | Culli et al. | |
| 6,765,921 B1 | 7/2004 | Stacey et al. | |
| 7,003,079 B1 | 2/2006 | McCarthy et al. | |
| 7,177,837 B2 | 2/2007 | Pegaz-Paquet et al. | |
| 7,207,008 B1 | 4/2007 | Koch | |

(Continued)

FOREIGN PATENT DOCUMENTS

| | | |
|---|---|---|
| CN | 1839594 | 9/2006 |
| EP | 0 695 059 A1 | 1/1996 |

(Continued)

OTHER PUBLICATIONS

Notification Concerning Transmittal of International Preliminary Report on Patentability (Chapter for the Patent Cooperation Treaty), from International Application No. PCT/IB2007/004259, dated Jun. 3, 2009.

(Continued)

*Primary Examiner* — Faruk Hamza
*Assistant Examiner* — Joel Hamel
(74) *Attorney, Agent, or Firm* — Sonia Cooper; Jim Ross; Micky Minhas

(57) ABSTRACT

A method of establishing a communication event in a communication system from an initiator device to one of a plurality of entities associated with the initiator device comprising assigning a calling identity to at least one of said entities at a first network node associated with a packet switched network; providing the assigned identity to the initiator device; storing associated contact information for the entity together with the calling identity assigned to the entity at a second network node associated with the packet switched network, initiating a communication event from the initiator device to the entity via a circuit switched network by transmitting the identity assigned to the entity to a gateway node; sending a message to the second network node with the identity assigned to the entity to determine the contact information for the entity; and routing the communication event from the gateway node to the entity using the determined contact information via one of the circuit switched and packet switched networks without said communication event being routed via said first network node.

20 Claims, 6 Drawing Sheets

(56) References Cited

U.S. PATENT DOCUMENTS

| | | |
|---|---|---|
| 7,298,714 B2 | 11/2007 | Foster |
| 7,298,814 B2 | 11/2007 | Foster |
| 7,403,517 B2 | 7/2008 | Westman |
| 7,454,201 B2 | 11/2008 | Brooking et al. |
| 7,548,536 B1 | 6/2009 | Alexander et al. |
| 7,565,436 B2 | 7/2009 | Rabie et al. |
| 7,675,881 B2 | 3/2010 | Verma et al. |
| 7,735,126 B2 | 6/2010 | Zhang et al. |
| 7,756,548 B2 | 7/2010 | Laroia et al. |
| 7,839,992 B2 | 11/2010 | Croak et al. |
| 7,929,955 B1 | 4/2011 | Bonner |
| 8,014,511 B2 | 9/2011 | Kaal et al. |
| 8,170,563 B2 | 5/2012 | Kaal |
| 8,175,091 B2 | 5/2012 | Kaal |
| 8,238,539 B2 | 8/2012 | Kaal |
| 8,320,546 B2 | 11/2012 | Kaal |
| 8,346,264 B2 | 1/2013 | Kaal |
| 8,457,144 B2 | 6/2013 | Kaal |
| 8,634,535 B2 | 1/2014 | Kaal |
| 2002/0032631 A1 | 3/2002 | Rose |
| 2002/0071424 A1 | 6/2002 | Chiu et al. |
| 2002/0071539 A1 | 6/2002 | Diament et al. |
| 2002/0103998 A1 | 8/2002 | DeBruine |
| 2002/0116464 A1 | 8/2002 | Mak |
| 2002/0137500 A1 | 9/2002 | Brooking et al. |
| 2002/0143855 A1 | 10/2002 | Traversat et al. |
| 2003/0002485 A1 | 1/2003 | Emerson |
| 2003/0105812 A1 | 6/2003 | Flowers, Jr. et al. |
| 2003/0112823 A1 | 6/2003 | Collins et al. |
| 2003/0130008 A1 | 7/2003 | Rajaniemi et al. |
| 2003/0224781 A1 | 12/2003 | Milford et al. |
| 2003/0227902 A1 | 12/2003 | Lindquist |
| 2005/0005030 A1 | 1/2005 | Asai |
| 2005/0074102 A1 | 4/2005 | Altberg et al. |
| 2005/0117735 A1 | 6/2005 | Seidman |
| 2005/0141509 A1 | 6/2005 | Rabie et al. |
| 2005/0144327 A1 | 6/2005 | Rabie et al. |
| 2005/0176410 A1 | 8/2005 | Brooking et al. |
| 2005/0286519 A1 | 12/2005 | Ravikumar et al. |
| 2006/0072547 A1 | 4/2006 | Florkey et al. |
| 2006/0072726 A1 | 4/2006 | Klein et al. |
| 2006/0077971 A1* | 4/2006 | Fowler ............... 370/352 |
| 2006/0227959 A1 | 10/2006 | Mitchell |
| 2006/0229101 A1 | 10/2006 | LaBauve et al. |
| 2006/0258289 A1 | 11/2006 | Dua |
| 2007/0019623 A1* | 1/2007 | Alt et al. ............. 370/352 |
| 2007/0066273 A1 | 3/2007 | Laraia et al. |
| 2007/0117548 A1 | 5/2007 | Fernandez-Alonso et al. |
| 2007/0124290 A1 | 5/2007 | Swanson et al. |
| 2007/0238472 A1 | 10/2007 | Wanless |
| 2008/0045186 A1 | 2/2008 | Black et al. |
| 2008/0137829 A1 | 6/2008 | Kaal et al. |
| 2008/0137834 A1 | 6/2008 | Kaal et al. |
| 2008/0139208 A1 | 6/2008 | Kaal |
| 2008/0144578 A1 | 6/2008 | Kaal |
| 2008/0152108 A1 | 6/2008 | Kaal et al. |
| 2008/0159271 A1 | 7/2008 | Kutt et al. |
| 2008/0165790 A1 | 7/2008 | Kaal |
| 2008/0192734 A1 | 8/2008 | Oruaas et al. |
| 2008/0205308 A1 | 8/2008 | Prehofer et al. |
| 2012/0033797 A1 | 2/2012 | Kaal et al. |
| 2012/0219009 A1 | 8/2012 | Kaal |

FOREIGN PATENT DOCUMENTS

| | | |
|---|---|---|
| EP | 1126676 | 8/2001 |
| EP | 1333637 | 8/2003 |
| EP | 1408704 | 4/2004 |
| EP | 1 515 506 A1 | 3/2005 |
| EP | 1 643 740 | 4/2006 |
| EP | 1 690 165 | 8/2006 |
| GB | 2398458 A | 8/2004 |
| GB | 2 405 285 A | 2/2005 |
| GB | 2443889 | 5/2008 |
| GB | 2445065 | 6/2011 |
| WO | WO 99/67922 | 12/1999 |
| WO | WO 00/51331 A1 | 8/2000 |
| WO | WO 01/24478 A2 | 4/2001 |
| WO | WO 01/39469 | 5/2001 |
| WO | WO-0141412 | 6/2001 |
| WO | WO 01/63861 | 8/2001 |
| WO | WO 02/076049 | 9/2002 |
| WO | WO 02/078268 A1 | 10/2002 |
| WO | WO 03/003678 A1 | 1/2003 |
| WO | WO 2005/009019 | 1/2005 |
| WO | WO 2005/084128 A1 | 9/2005 |
| WO | WO-2006003069 | 1/2006 |
| WO | WO 2006/095787 A1 | 9/2006 |
| WO | WO 2007/044049 A2 | 4/2007 |
| WO | WO 2007/077550 A1 | 7/2007 |
| WO | WO-2008062313 | 5/2008 |
| WO | WO-2008065533 | 6/2008 |

OTHER PUBLICATIONS

Notification Concerning Transmittal of International Preliminary Report on Patentability (Chapter I of the Patent Cooperation Treaty), from International Application No. PCT/IB2007/004279, dated Jun. 11, 2009.

Notification Concerning Transmittal of International Preliminary Report on Patentability (Chapter I of the Patent Cooperation Treaty), from International Application No. PCT/IB2007/004260, dated Jun. 11, 2009.

Search Report Under Section 17 for GB 0723123.6, Date of Search: Apr. 18, 2008.

"Advisory Action", U.S. Appl. No. 11/986,835, (Sep. 15, 2011), 3 pages.

"Advisory Action", U.S. Appl. No. 11/986,972, (Jan. 4, 2012), 2 pages.

"Advisory Action", U.S. Appl. No. 11/986,974, (Jun. 2, 2011), 3 pages.

"Examination Report under Section 18(3)", Application No. GB0723119.4, Apr. 27, 2011, 1 page.

"Final Office Action", U.S. Appl. No. 11/986,018, (Mar. 30, 2012), 36 pages.

"Final Office Action", U.S. Appl. No. 11/986,835, (Jun. 23, 2010), 20 pages.

"Final Office Action", U.S. Appl. No. 11/986,835, (Jul. 8, 2011), 29 pages.

"Final Office Action", U.S. Appl. No. 11/986,972, (Oct. 19, 2011), 11 pages.

"Final Office Action", U.S. Appl. No. 11/986,973, (Apr. 13, 2011), 23 pages.

"Final Office Action", U.S. Appl. No. 11/986,973, (Apr. 24, 2012), 24 pages.

"Final Office Action", U.S. Appl. No. 11/986,974, (Mar. 17, 2011), 8 pages.

"International Search Report and Written Opinion", International Application No. PCT/IB2007/004251, (Jul. 15, 2008), 8 pages.

"International Search Report and Written Opinion", International Application No. PCT/IB2007/004259, (Jul. 11, 2008), 13 pages.

"Non Final Office Action", U.S. Appl. No. 11/986,018, (Sep. 27, 2007), 32 pages.

"Non Final Office Action", U.S. Appl. No. 11/986,972, (Mar. 30, 2011), 10 pages.

"Non Final Office Action", U.S. Appl. No. 11/986,973, (Oct. 22, 2010), 22 pages.

"Non Final Office Action", U.S. Appl. No. 11/986,973, (Nov. 23, 2011), 24 pages.

"Non Final Office Action", U.S. Appl. No. 11/986,976, (Oct. 27, 2011), 8 pages.

"Non-Final Office Action", U.S. Appl. No. 11/986,835, (Nov. 24, 2010), 25 pages.

"Non-Final Office Action", U.S. Appl. No. 11/986,835, (Dec. 21, 2009), 10 pages.

"Non-Final Office Action", U.S. Appl. No. 11/986,974, (Jul. 18, 2011), 11 pages.

(56) References Cited

OTHER PUBLICATIONS

"Non-Final Office Action", U.S. Appl. No. 11/986,974, (Sep. 29, 2010), 11 pages.
"Non-Final Office Action", U.S. Appl. No. 13/195,541, (May 25, 2012), 4 pages.
"Notice of Allowance", U.S. Appl. No. 11/986,835, (Mar. 15, 2012), 13 pages.
"Notice of Allowance", U.S. Appl. No. 11/986,835, (Dec. 6, 2011), 13 pages.
"Notice of Allowance", U.S. Appl. No. 11/986,974, (Mar. 15, 2012), 12 pages.
"Notice of Allowance", U.S. Appl. No. 11/986,976, (Apr. 5, 2012), 4 pages.
"Notice of Allowance", U.S. Appl. No. 11/986,977, (May 3, 2011), 10 pages.
"Preliminary Report on Patentability and Written Opinion", International Application No. PCT/IB2007/004260, (Jun. 3, 2009), 8 pages.
"Preliminary Report on Patentability and Written Opinion", International Application No. PCT/IB2007/004279, (Jun. 3, 2009), 8 pages.
"Search Report under Section 17", Application No. GB0623103.9, (Feb. 14, 2008), 1 page.
"Supplemental Notice of Allowance", U.S. Appl. No. 11/986,977, (Aug. 17, 2011), 2 pages.
"Supplemental Notice of Allowance", U.S. Appl. No. 11/986,977, (Jun. 21, 2011), 2 pages.
"Advisory Action", U.S. Appl. No. 11/986,973, (Jul. 17, 2012), 3 pages.
"Final Office Action", U.S. Appl. No. 13/195,541, (Aug. 15, 2012), 6 pages.
"Notice of Allowance", U.S. Appl. No. 13/460,249, (Aug. 3, 2012), 7 pages.
"Corrected Notice of Allowance", U.S. Appl. No. 11/986,973, (Dec. 21, 2012), 2 pages.
"Examination Report", GB Application No. 0723120.2, (Nov. 18, 2010), 2 pages.
"Examination Report", GB Application No. 0723121.0, (Dec. 14, 2010), 3 pages.
"Examination Report", GB Application No. 0723122.8, (Nov. 9, 2010), 5 pages.
"Foreign Office Action", Chinese Application No. 200780044011.8, (Jul. 18, 2012), 10 pages.
"Foreign Office Action", Chinese Application No. 200780044026.4, (Jul. 2, 2012), 7 pages.
"Foreign Office Action", Chinese Application No. 200780044172.7, (Oct. 18, 2012), 9 pages.
"Foreign Office Action", EP Application No. 07859289.6, (Feb. 10, 2010), 3 pages.
"Foreign Office Action", EP Application No. 07859298.7, (Feb. 10, 2012), 4 pages.
"Foreign Office Action", EP Application No. 07859316.7, (Sep. 23, 2009), 9 pages.
"Foreign Office Action", Israel Application No. 198886, (Sep. 24, 2012), 4 pages.
"International Search Report and Written Opinion", Application No. PCT/IB2007/004261, (Jul. 28, 2008), 9 pages.
"International Search Report and Written Opinion", Application No. PCT/IB2007/004250, (Aug. 21, 2008), 9 pages.
"International Search Report and Written Opinion", Application No. PCT/IB2007/004298, (Jul. 22, 2008), 9 pages.
"International Search Report and Written Opinion", Application No. PCT/IB2007/004279, (Jul. 1, 2008), 8 pages.
"International Search Report and Written Opinion", Application No. PCT/IB2007/004249, (Aug. 27, 2008), 7 pages.
"Search Report", GB Application No. 0723117.8, (Mar. 23, 2008), 1 page.
"Search Report", GB Application No. 0723118.6, (Apr. 9, 2008), 1 page.
"Search Report", GB Application No. 0723118.6, (Nov. 18, 2010), 2 pages.
"Search Report", GB Application No. 0723119.4, (Mar. 27, 2008), 1 page.
"Search Report", GB Application No. 0723119.4, (Apr. 27, 2011), 2 pages.
"Search Report", GB Application No. 0723120.2, (Apr. 10, 2008), 1 page.
"Search Report", GB Application No. 0723121.0, (Apr. 16, 2008), 1 page.
"Search Report", GB Application No. 0723122.8, (Mar. 31, 2008), 1 page.
"Non-Final Office Action", U.S. Appl. No. 13/460,249, (Jun. 1, 2012), 9 pages.
"Advisory Action", U.S. Appl. No. 11/986,018, (Jun. 19, 2012), 3 pages.
"Foreign Office Action", Chinese Application No. 200780044111.0, (May 3, 2012), 12 pages.
"Foreign Office Action", European Application No. 07859297.9, (Nov. 9, 2009), 4 pages.
"Foreign Office Action", European Application No. 07866605.4, (Feb. 8, 2010), 3 pages.
"Foreign Office Action", New Zealand Application No. 577113, (Dec. 22, 2010), 2 pages.
"Foreign Office Action", New Zealand Application No. 577113, (Jul. 25, 2012), 3 pages.
"Foreign Office Action", New Zealand Application No. 577113, (Apr. 12, 2012), 3 pages.
"Foreign Office Action", New Zealand Application No. 601925, (Aug. 27, 2012), 2 pages.
"Notice of Allowance", U.S. Appl. No. 11/986,972, (Sep. 19, 2012), 5 pages.
"Notice of Allowance", U.S. Appl. No. 11/986,973, (Nov. 6, 2012), 16 pages.
"Supplemental Notice of Allowance", U.S. Appl. No. 11/986,972, (Oct. 30, 2012), 2 pages.
"Corrected Notice of Allowance", U.S. Appl. No. 11/986,973, (Feb. 15, 2013), 4 pages.
"Notice of Allowance", U.S. Appl. No. 13/195,541, (Jun. 7, 2013), 6 pages.
"Non-Final Office Action", U.S. Appl. No. 11/986,018, (Jun. 18, 2013), 36 pages.
"Supplemental Notice of Allowance", U.S. Appl. No. 13/195,541, (Sep. 11, 2013), 2 pages.
"Notice of Allowance", U.S. Appl. No. 11/986,018, Feb. 19, 2014, 6 pages.

\* cited by examiner

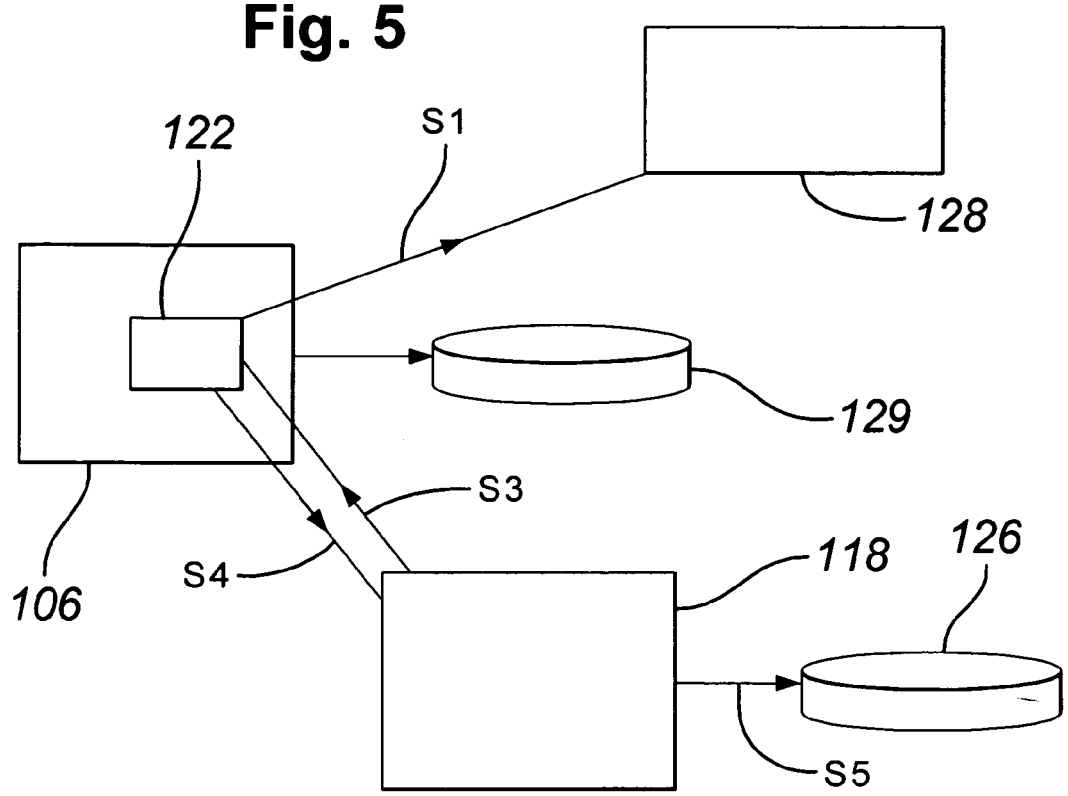
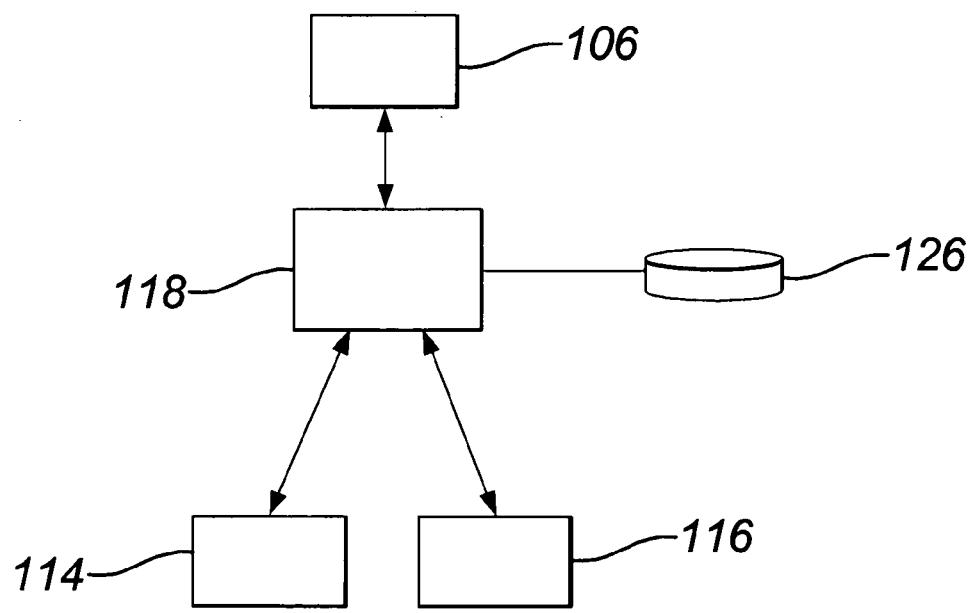

COMMUNICATION SYSTEM

RELATED APPLICATIONS

This application claims priority under 35 U.S.C. §119 or 365 to Great Britain Application No. 0623622.8, filed Nov. 27, 2006 and Great Britain Application 0723123.6 filed Nov. 23, 2007. The entire teachings of the above applications are incorporated herein by reference.

TECHNICAL FIELD

The present invention relates to a method for handling communication in a communication system.

BACKGROUND

In a communication system a communication network is provided, which can connect two communication terminals so that the terminals can send information to each other in a call or other communication event. Information may include voice, text, images or video.

One such communication system is a peer to peer communication system, in which a plurality of end users can be connected for communication purposes via a communications structure such as the internet using peer to peer client software. The communications structure is substantially decentralised with regard to communication route switching therein for connecting the end users. That is, the end users can establish their own communication routes through the structure based on exchange of one or more authentication certificates (user identity certificates—UIC) to acquire access to the structure. The structure includes an administration arrangement issuing the certificates to the end users. Such a communication system is described in WO 2005/009019.

Peer-to-peer communications are beneficial to the user as they are often of significantly lower cost than traditional communication networks, such as fixed line or mobile networks. This may particularly be the case for long distance calls. These systems may utilise voice over internet protocol ("VoIP") over an existing network (e.g. the Internet) to provide these services, although alternative protocols can also be used.

In a communication system, such as a peer to peer system, client software is installed on an end user device such as a personal computer (PC) to allow the end user to communicate via the communications network and to identify the user within the communication network. The user interface of the client software can be controlled by the client to display user facilities and to indicate events occurring, such as an incoming call. FIG. 1A is a diagram of an end user device 10 running client software to communicate directly with the peer to peer system. The client software comprises a user interface layer 12, a client engine layer 14, and a protocol layer. The protocol layer is arranged to handle the communication between the client engine and the peer to peer system 104.

Users may be accustomed to mobility whilst using conventional telephony services, due to the prevalence of cordless phones and mobile cellular networks. It is therefore desirable to run the client software on mobile devices such as a mobile phone or other battery operated cordless device. However, running the client software on a mobile end user device presents a number of problems. Hand held mobile devices are typically battery operated and have less CPU resource than a PC. The power requirement used to run the client software to handle the communications can reduce the battery life considerably for battery operated devices. Furthermore, running the client software on the user device may use valuable CPU resources that are required to run other applications on the device.

One further problem caused by using a mobile device in an VoIP communication system is that in a VoIP system such as a peer to peer system, it is necessary to be constantly connected to the internet in order to be notified of communication events, such as receiving a call. Maintaining a constant connection between the communication network and the internet is not only an inefficient use of battery life and CPU resources of the device, but also an inefficient use of network connection resources. Also being constantly connected to the internet may be costly for a user. Furthermore the quality of the connection to the internet may be poor therefore degrading the quality of the communication.

SUMMARY

It is therefore an aim of embodiments of the invention to address at least one of the above identified problems.

According to a first aspect of the present invention there is provided a method of establishing a communication event in a communication system from an initiator device to one of a plurality of entities associated with the initiator device comprising: assigning a calling identity to at least one of said entities at a first network node associated with a packet switched network; providing the assigned identity to the initiator device; storing associated contact information for the entity together with the calling identity assigned to the entity at a second network node associated with the packet switched network, initiating a communication event from the initiator device to the entity via a circuit switched network by transmitting the identity assigned to the entity to a gateway node; sending a message to the second network node with the identity assigned to the entity to determine the contact information for the entity; and routing the communication event from the gateway node to the entity using the determined contact information via one of the circuit switched and packet switched networks without said communication event being routed via said first network node.

According to a second aspect of the present invention there is provided a communication system comprising a packet switched network and a circuit switched network for routing a communication event from an initiator device to one of a plurality of entities associated with the initiator device the communication system comprising: a first network node located in the packet switched network arranged to assign a calling identity to at least one of said entities and to provide the assigned identity to the initiator device; a second network node located in the packet switched network arranged to store associated contact information for the entity together with the calling identity assigned to the entity; a gateway node arranged to receive the communication event addressed using the calling identity assigned to the entity from the initiator device via the circuit switched network; wherein the second network node is further arranged to determine the contact information for the entity in response to receiving a message with the identity assigned to the entity and to provide the contact information to the gateway node such that the communication event may be routed from the gateway node to the entity via one of the circuit switched and packet switched networks without said communication event being routed via said first network node.

According to a third aspect of the present invention there is provided a network node for use in a communication system comprising: means for providing a calling identity to be allocated to an entity to another network node located in the communication system; means for receiving allocation information and contact details for the entity from the other network node; means for storing the calling identity for an entity in association with contact details for the entity using the allocation information; means for receiving calling information for a call initiated by an initiator device, said calling information comprising the calling identity; means for retrieving the contact details for the entity based on the received the calling information; and means for providing the contact details of the receiving the device to a routing node route the call the entity.

In accordance with embodiments of the present invention, contact information is provided to the gateway node. In this case it is not necessary for the communication event to be routed via the network node.

BRIEF DESCRIPTION OF THE DRAWINGS

For a better understanding of the present invention and to show how the same may be carried into effect, embodiments of the present invention will now be described with reference to the following drawings:

FIG. 5 is a diagram illustrating the steps for allocating a PSTN number to a contact in accordance with an embodiment of the invention;

FIG. 7 is a diagram showing the logical connections between the call manager, the session node, the inbound gateway and the outbound gateway in accordance with an embodiment of the invention.

DETAILED DESCRIPTION

Figure 1:
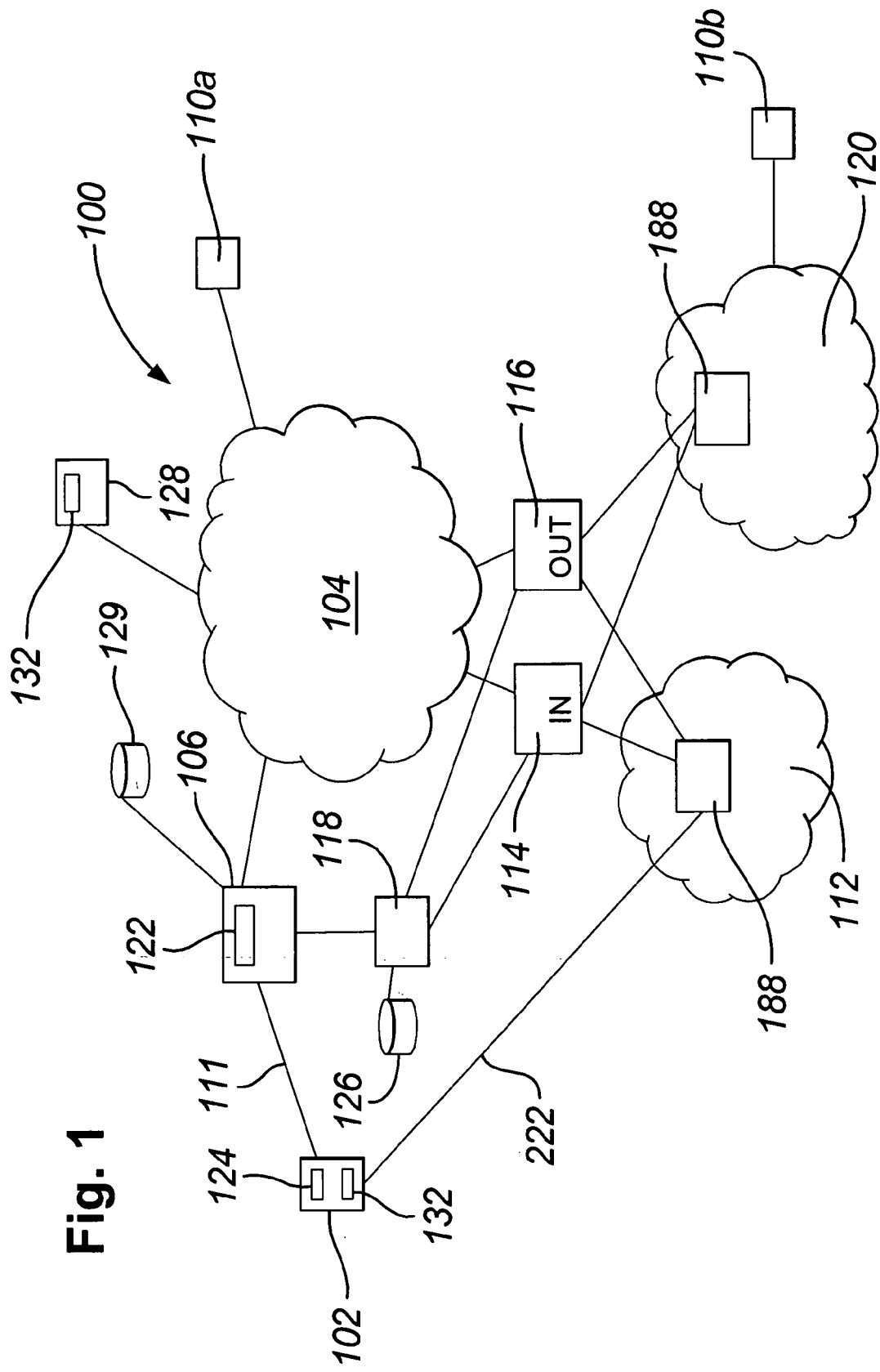
FIG. 1 is a schematic representation of a communication system in accordance with an embodiment of the invention.

Reference will first be made to FIG. 1, in which is shown a communication network 100, including a packet switched communication system 104 and circuit switched networks 112 and 120. In one embodiment the packet switched communication system 104 may be a peer to peer system operating on a packet switched network such as the internet. The circuit switched networks 112, 120 may comprise PSTN (Public Switched Telephone Network) networks.

A user device 102 is shown to be connected to the peer to peer system 104 via a session node 106. The user device 102 is also connected to the PSTN network 120. In one embodiment of the invention the user device is connected to the circuit switched network 112 via a circuit switched connection 222 and to the session node 106 via a packet switched connection 111. The circuit switched connection 222 and the packet switched connection 111 may be provided by a GSM (Global System for Mobile Communications) network (not shown). For example the packet switched connection may be provided by a GPRS (General Packet Radio Service) connection of the GSM network whilst the circuit switched connection may be provided by a GSM audio connection of the GSM network. In a preferred embodiment of the invention the packet switched connection 111 is used to transmit packet data according to an internet protocol such as Transmission Control Protocol (TCP).

The user device 102 may be, for example, a personal computer, a gaming device, a personal digital assistant, a suitably enabled mobile phone, or other device able to connect to the internet.

The user device 102 runs a client software program 124 that provides a client interface on the device and allows the user device to communicate with the session node 106. The session node 106 runs a communication instance 122 defining a session dedicated to the user device 102. The communication instance 122 enables the user device 102 to communicate with the peer to peer communication system 104. The communication instance also includes a protocol adaptor instance which enables the communication instance 122 to communicate with the client program 124. The session node 106 is able to run a plurality of communication instances for a number of concurrent user devices (not shown).

The client program 124 running on the user device has a number of different components or layers for implementing various functions, including a protocol layer 402 (FIG. 3b) for managing the interface with the GSM network. The interface with the GSM network will now be described with reference to FIG. 3a.

Figure 3A:
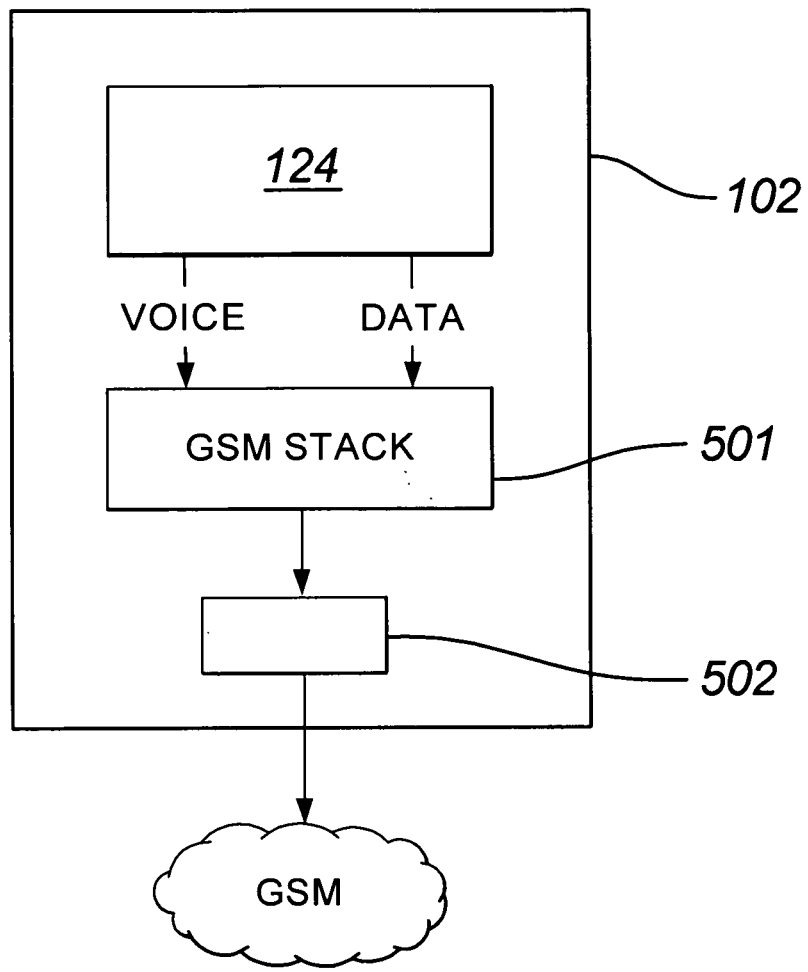
FIG. 3a is a diagram showing a user device in accordance with an embodiment of the present invention.

FIG. 3a is a schematic diagram showing the transmission of data between the client program 124 and a GSM protocol stack in the user device 102. As shown in FIG. 3a the user device 102 further comprises the GSM protocol stack 501 and a radio transceiver 502. Information transmitted from the GSM network to the user device is received by the transceiver 502. The data received from the GSM network is processed by GSM protocol stack 501 before it is transmitted to the client program 124. Similarly, information to be transmitted to the GSM network from the client program 124 is processed by the GSM protocol stack 501 before it is transmitted to the GSM network via the transceiver 502. The operation of the GSM protocol stack 501 is known in the art and will not be described in detail herein.

As shown in FIG. 1 the peer to peer system 104 comprises an inbound gateway 114 and an outbound gateway 116. The inbound gateway 114 and the outbound gateway 116 are connected to PSTN gateways 188 located in the PSTN networks. The inbound gateway 114 is arranged to receive data for the peer to peer system on the internet 104 from the PSTN gateways 188. The outbound gateway 116 is arranged to transmit data from the peer to peer system on the internet 104 to the to the PSTN gateways 188.

A call manager 118 is connected between the session node 106 and the inbound gateway 114. In FIG. 1 the call manager 118 is shown as being located separately from the session node 106 and the inbound gateway 114. The call manager 118 may however form part of either the session node 106 or the inbound gateway 114. The operation of the call manager 118 will be explained hereinafter.

Also shown in FIG. 1 is a profile node 128. The profile node 128 is responsible for storing user profile information for users of the peer to peer system. The user profile information includes login information for logging into the peer to peer system and a contact list 132 associated with each user of the peer to peer system.

The login details may define a login in name and password to allow the user of the user device 102 to log in to the peer to peer network and allow the user of the user device to be uniquely identified within the peer to peer system.

The contact list 132 comprises the addresses of, for example, other users of the communication system stored as contacts by a user. The contact information may define a telephone number, an IP (Internet Protocol) address, a URI (Uniform Resource Indicator), a username, a VoIP device or any other destination address capable of receiving a communication event across the communication network 100. In one embodiment of the invention the contact information for the list of contacts may comprise a list of destination addresses within the internet.

Figure 2:
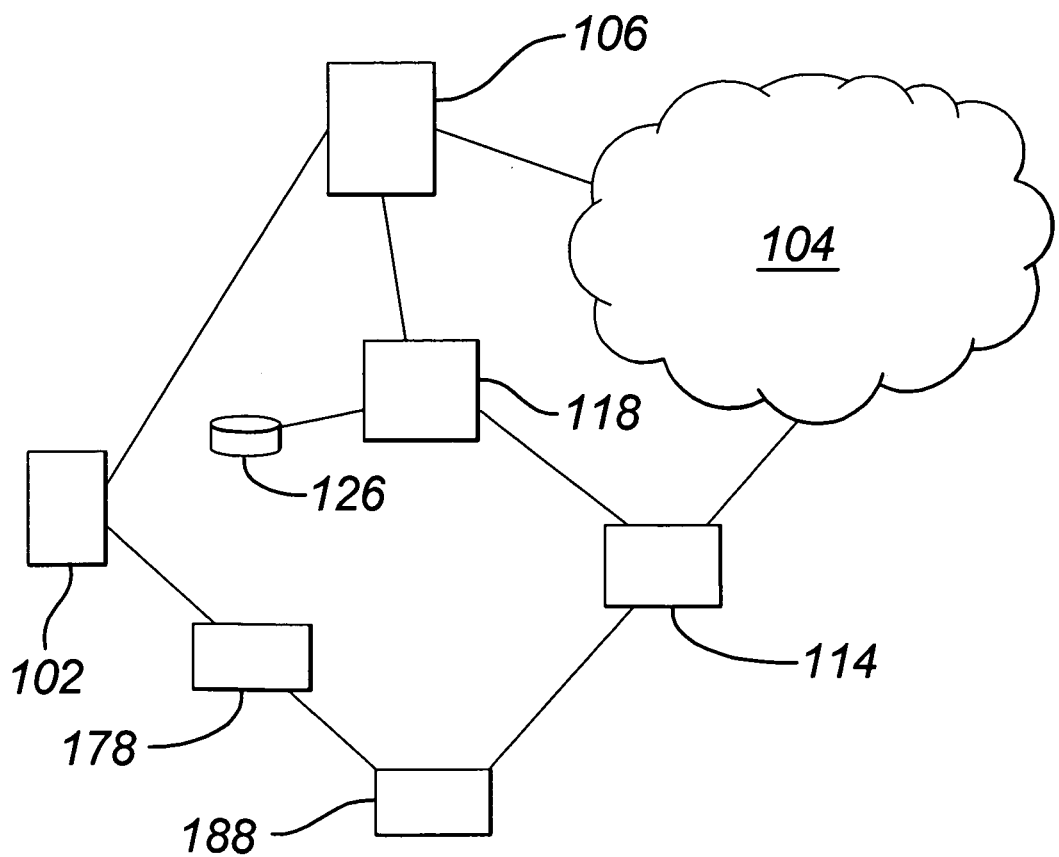
FIG. 2 is a schematic representation of part of the communication system shown in FIG. 1.

Reference will now be made to FIG. 2 which shows a more detailed diagram of part of the communication system 100. Components of the communication system 100 described in relation to FIG. 1 that are also shown in FIG. 2 are labelled with common reference numerals. Additionally shown in FIG. 2 are a circuit switched network access node 178 and a PSTN network gateway 188 and a data store 126 associated with the session node 106. The access node 178 and the PSTN gateway 188 form part of the circuit switched network 112. The storage device 126 is associated with the call manager.

Figure 3B:
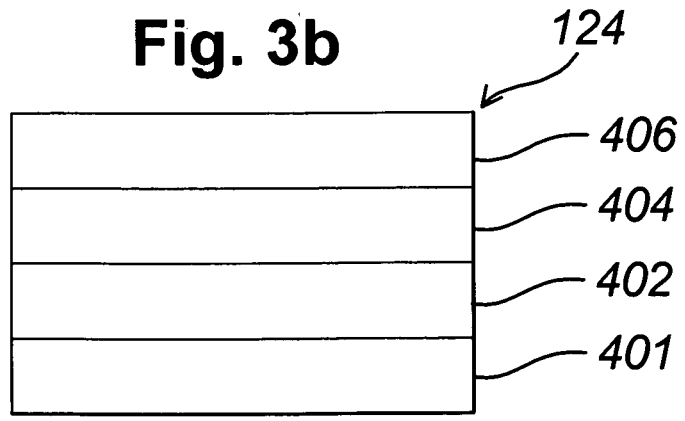
FIG. 3b is a diagram showing the protocol stack of a client program in accordance with an embodiment of the present invention.

Reference will now be made to FIG. 3*b*. FIG. 3*b* shows a protocol stack for the client program 124 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 3*b*.

The operating system layer 401 manages the hardware resources of the user device 102 and handles data being transmitted to and from the session node 106 via the GSM protocol stack. The operating system layer also handles the data being transmitted to and from the network 112 via the GSM protocol stack. The client protocol layer 402 of the client software communicates with the operating system 401. Processes requiring higher level processing are passed to the client engine layer 404. The client engine 404 also communicates with the user client user interface layer 406. The client engine may be arranged to control the client user interface layer 406 to present information to the user via user interface means of the user device and to receive information from the user via the user interface means of the user device. The user interface means may comprise a speaker, a microphone, a display screen and a keyboard. This list is not exhaustive.

Figure 4:
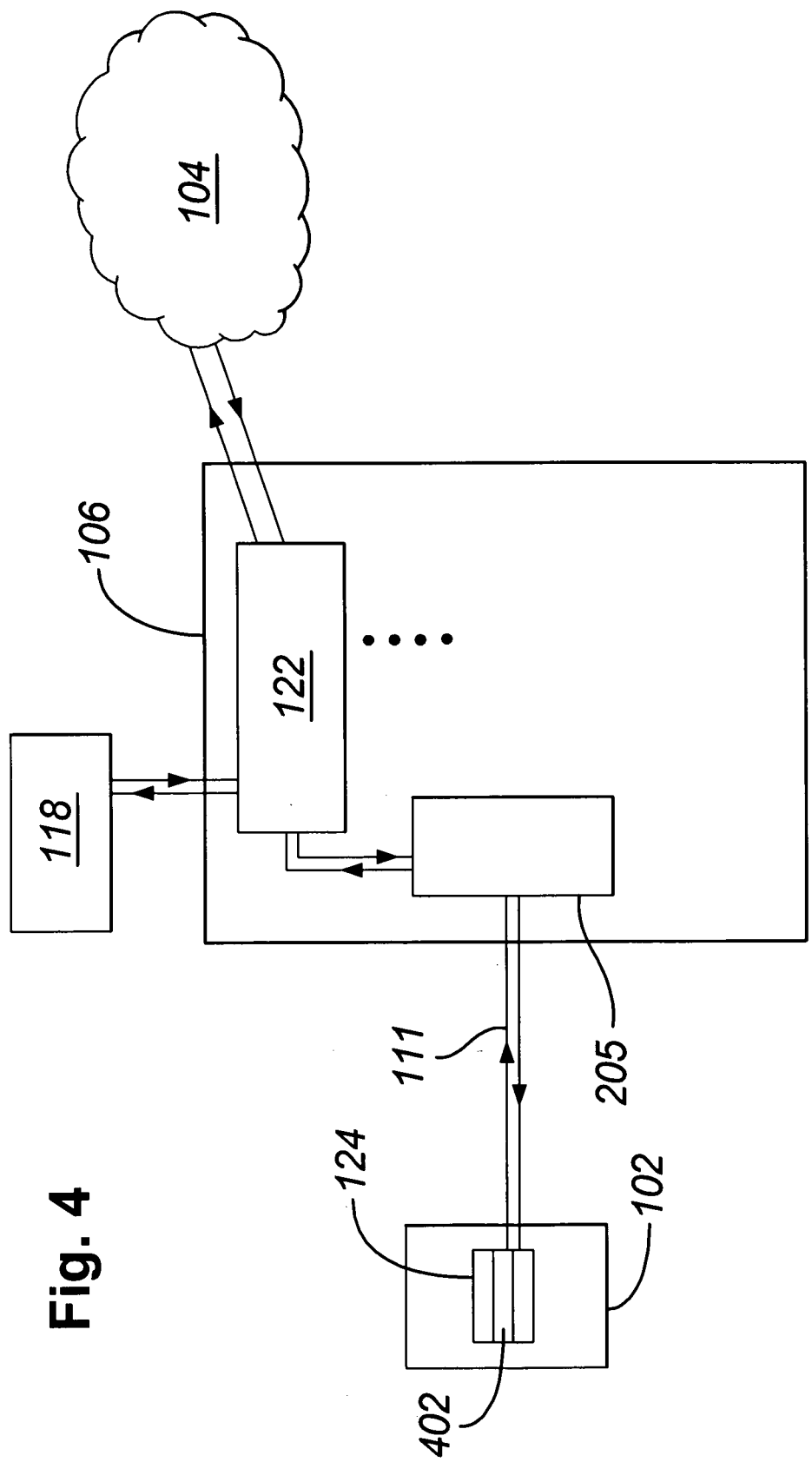
FIG. 4 is a diagram showing the communication path between a user device and a session node in accordance with the present invention.

The communication instance 122 running on the session node 106 enables the communication between the client program 124 running on the device 102 and the peer to peer system 104. FIG. 4 shows the connection path between the communication instance 122 on the session node 106 and the client program 124 running on the user device 102.

As shown in FIG. 4, the session node 106 comprises a core module 205 for allocating a communication instance 122 to a client program 124. In accordance with an embodiment of the invention, when a client program 124 transmits a login request to the session node 106, the core module 205 is arranged to assign a communication instance 122 to the client program 124.

The communication instance 122 may be selected from a pool of available communication instances. Alternatively the invention the communication instance may be created when the client program 124 logs in.

It is possible that the protocol layer 402 of the client 124 uses a different protocol to the protocol used within the communication instance 122. The protocol adaptor in the communication instance facilitates the communication between the client program 124 and the communication instance 122.

The communication instance 122 is also arranged to communicate with the call manager 118.

Figure 1A:
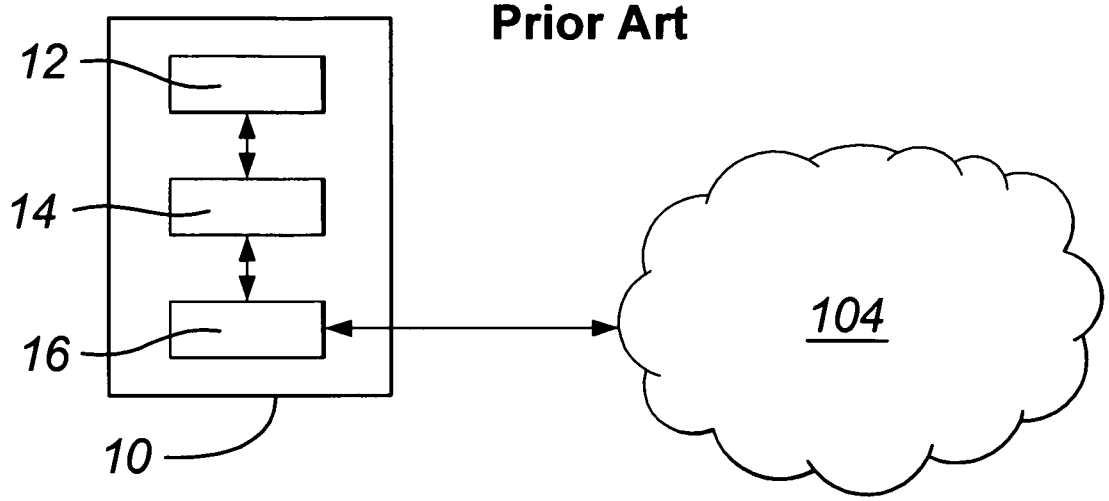
FIG. 1A is a schematic diagram of an end user device running client software for making VoIP calls.

It will be apparent that in contrast to FIG. 1*a*, the device 102 runs only the user interface part of the software; The communication part responsible for communicating with the peer to peer network is executed at the session node 106, not at the device 102. Thus device 102 consumes less battery and CPU resource.

The client program 124 communicates with the session node 106 via a packet switched data connection 111. The client program 124 may communicate with the session node 106 using TCP (Transmission Control Protocol) or other suitable internet protocol.

In accordance with an embodiment of the invention the client program 124 is arranged to log in the peer to peer system 104 by transmitting login details such as a user login name and password to the session node 106 over the data connection 111. On receipt of log in details the session node is arranged to assign a communication instance 122 to the client program 124. The communication instance 122 is then arranged to check the login details with the user's profile information stored on the profile node 128 and to sign in to the peer to peer system 104 using the login details.

When a communication instance is assigned to a user device, this defines a session between the client program 124 and the session node 106 for communicating with the peer to peer system 104. The communication instance generates a session identifier and transmits the session identifier to the client program 124 over the data connection 111.

When a session is initiated for a user device 102 the communication instance 122 running on the session node 106 is arranged to retrieve the contact list 132 associated with the user of the client program 124 and to send at least part of the contact list 132 to the client program 124. The contact list 132 can be retrieved by the communication instance from the profile node 128.

According to an embodiment of the invention a PSTN number is assigned to the each contact by communication instance to enable the client program to establish a call to a contact via the PSTN network. The method of assigning a PSTN number to a contact will now be described with reference to FIG. 5.

In step S1 the communication instance 122 is arranged to retrieve the addresses of the entities of that are listed as contacts in the contact list 132 associated with the user of the user device 102. The addresses of the entities are retrieved from the profile node 128.

In step S2 the communication instance stores the address of each entity in the data store 129. In a preferred embodiment of the invention the entire contact list 132 is stored in the data store 129.

In step S3 the communication instance 122 is then arranged to retrieve a PSTN number for each entity listed in the contact list from the call manager.

In step S4 the communication instance 122 is arranged to allocate each PSTN number to each entity listed in the contact list and to report the address of each entity to the call manager, together with an indication of which PSTN number has been allocated to which entity.

In step S5 the call manager 118 is arranged to store in the data store 126 the address of each entity listed in the contact list in association with the allocated PSTN number.

In a preferred embodiment of the invention the call manager 118 is arranged to additionally store in the data store 126 the PSTN number of the user device 102 in association with the PSTN number allocated to the entity. The PSTN number of the device may be reported to the call manager in either step S3 or step S4 by the communication instance. In this embodiment the communication address of the entity may be resolved using the PSTN number allocated to the entity and the PSTN number of the device. In this case one PSTN number may be allocated for use by more than one user having a communication instance running on the session node 106.

The allocated PSTN numbers may be stored in association with the address of each entity and the PSTN number of the user device 102 for the duration of the session between the client program 124 running on the device 102 and the session node 106. A session is started when the session node 106 assigns a dedicated communication instance 122 to the client program 124. A session may be closed when the client program 124 transmits a logout request to the session node, or when a session is timed out.

The contact list 132 together with the PSTN numbers allocated to each entity in the contact list are transmitted from the communication instance to the client program 124. The contact list 132 and the allocated PSTN numbers may then be stored in a data store accessible to the client program 124, located in the user device 102.

In a preferred embodiment of the invention the allocated PSTN numbers and the contact list 132 are transmitted to the client program 124 in data packets via the data connection 111. The allocated PSTN numbers may be provided in a separate data packet from the contact list 132.

As previously stated, the client program 124 is arranged to receive information from the session node 106 via the packet switched connection 111. The client program 124 is arranged to use the allocated PSTN numbers transmitted over the packet switched connection 111 to initiate circuit switched calls to the contacts listed in the contact list 132' using the GSM audio connection 222. It is an important aspect of the present invention that circuit switched data such as call data is not routed though the session node 106. However packet switched data, such as IM (Instant Messaging) and chat data, may be transmitted via the session node 106 using the URI of the contact.

In accordance with an embodiment of the invention, during a communication event to a contact using the calling identifier, the call manager 118 is arranged to retrieve the contact details of the contact from the data store 126 in response to receiving the calling identifier. The contact details retrieved by the call manager may be provided to the inbound gateway 114 to allow the communication event to be routed. The logical connections between the call manager 118 the session node 106 and the gateways 114, 116 are shown in FIG. 7.

Figure 6:
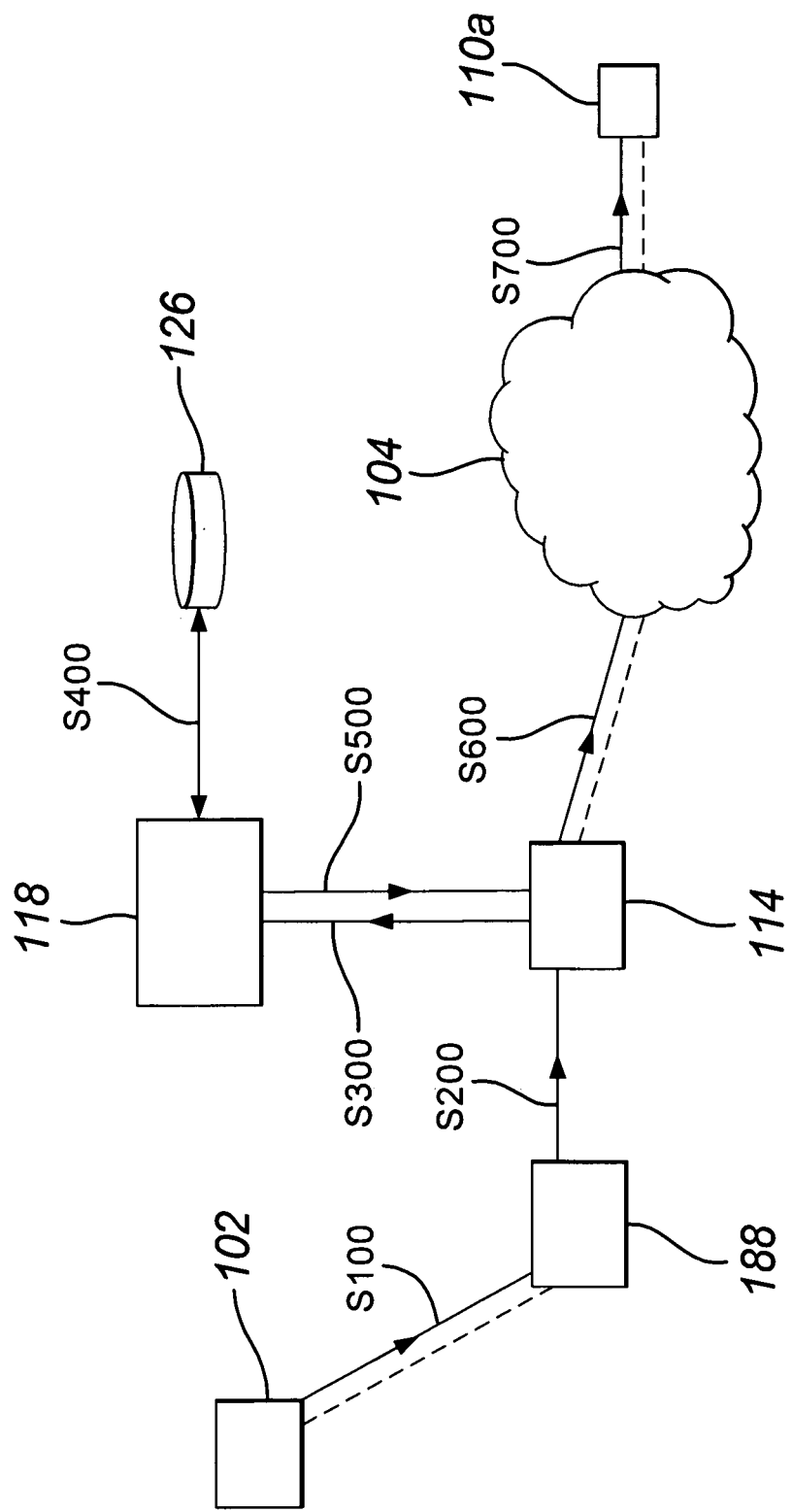
FIG. 6 is a diagram showing the steps for initiating a call over the communication system in accordance with an embodiment of the present invention.

Reference will now be made to FIG. 6. FIG. 6 is a diagram showing how a data in a communication event such as a call is transmitted by a user of the user device to a contact listed in the list 132 using the PSTN network 112.

A call comprises both a media data connection and a control data for handling the call set up. In FIG. 6 the control data connection for transmitting control data and the media data connection for transmitting the media data are shown separately. The control data connection is shown as a solid line and the call connection is shown as a broken line.

In step S100 the user of the user device 102 initiates a call to an entity listed in the contact list 132. The contact list 132 may be displayed by the user interface layer of the client program 124 as selectable links on a display of the user device 102. The user may initiate a call to the entity by selecting a link for that entity. When the user initiates the call the client program 124 is arranged to dial the PSTN number allocated to that entity. The call placed by the client program 124 will therefore include control data that defines the allocated PSTN number. The control data will also include the PSTN number of the user device 102. The dialled PSTN number allocated to entity is used to establish a media data connection and control data connection with the PSTN gateway 188 via the GSM audio connection 222.

In step 200 the media data connection is held at the PSTN gateway 188. The PSTN gateway 188 is arranged to transmit the control data to the inbound gateway located in the internet 104. The PSTN gateway 188 is arranged to transmit control data comprising recognised PSTN numbers to the inbound gateway 114. The PSTN gateway may recognise numbers that have been provided for use by the call manager 118 by the operator of the PSTN network.

In step S300 the inbound gateway 114 transmits the control data comprising the allocated PSTN number of the called entity and the PSTN number of the user device to the call manager 118. The media data connection is held at the PSTN gateway 188 until the allocated PSTN number of the called entity is resolved to the address of the entity.

At step S400 the call manager 118 uses the PSTN number of the device 102 to search the data store 126 for the contact list 132 associated with the user of the device 102. The PSTN allocated to the entity is then used to locate the address of the entity as defined in the contact list 132. In one embodiment of the invention the call manager may also retrieve the username of the user associated with the user of the user device 102.

In step S500 the address of the entity is transmitted to the inbound gateway 114. The call manager 118 may also transmit the username of the user of the user device 102 to the inbound gateway 114.

In step S600 the inbound gateway 114 accepts the media data from the PSTN gateway and uses the address of the entity received from the call manager 118 to transmit the call via the packet switched network 104. If the address of the entity is located in the PSTN network the inbound gateway will transmit the call to the PSTN network via the outbound gateway 116 (shown in FIG. 1).

In step S700 the call is received at the called entity, e.g. device 110a or 110b. If the called entity is located in the internet 104 the username of the user of the device 102 retrieved in step S500 may be displayed on the device 110a to indicate the origin of the call.

In an alternative embodiment of the present invention the entity that the user of the user device 102 places a call to is not listed as a contact in the contact list 132. In this embodiment of the invention the user device 102 is arranged to provide the communication instance 122 with the address of the entity via the data connection 111 before initiating a call with the entity. In this embodiment of the invention a PSTN number defined in the 'call set up' message described in relation to table 2 is reserved for an entity that is not listed in the contact list. When the communication instance receives the address of the entity from the user device, the address of the entity is stored in the data store 126 in association with the reserved PSTN number. A call may then be placed to the entity via the PSTN network in accordance with the method steps described in relation to FIG. 6.

According to one embodiment of the invention the call manager selects a PSTN number to assign in dependence on the location information of the user device 102. According to this embodiment the assigned number may be associated with an inbound gateway that is located geographically closer to the user device than other inbound gateways in the communication system, a so called "local number".

While this invention has been particularly shown and described with reference to preferred embodiments, it will be understood to those skilled in the art that various changes in form and detail may be made without departing from the scope of the invention as defined by the claims.

In particular, a number of different embodiments can be implemented, as discussed in the following.

In an alternative embodiment of the invention the PSTN number of the user device may not be available. In this embodiment of the invention the allocated PSTN number will correspond directly to the address of the contact. As such the call manager may resolve the address of the contact by searching the data store with the allocated PSTN number only.

In one embodiment of the invention the inbound gateway 114 may be arranged to not t accept the media data connection from the PSTN gateway 188. In this embodiment of the invention the inbound gateway 114 is arranged to provide the PSTN gateway 188 with the address of the contact such that the PSTN gateway may route the call via the PSTN network. This embodiment of the invention may be applied when the address of the contact is a PSTN number.

In one embodiment of the invention a contact listed in the contact list 132 may be associated with a plurality of locations in the communication system. For example a contact may be connected to the internet with using more that one device. According to this embodiment of the invention the contact details of the contact, for example the username of the contact will be associated with a plurality of locations in the internet. As such when the user of the user device establishes a call with the contact, the call may be received at the plurality of locations.

In place of one inbound and outbound gateway, in one embodiment of the invention there are a plurality of inbound and outbound gateways located in the communication system 100 (not shown).

In a further embodiment of the invention more than one call manager may be arranged in the communication system (not shown). Each call manager may be connected to a different set of session nodes.

The data store 126 is shown to be associated with the call manager 118. However the data store can be geographically separate from the call manager 118. In an alternative embodiment of the invention the data store 126 may be associated with the session node and may be accessed by the call manager 118 via the session node. In a further alternative embodiment of the invention the data store may be located at session node 106. In a further embodiment of the invention the data store may be comprise to separate storage locations provided at the call manager 118 and the session node 106 respectively.

In accordance with one embodiment of the invention the PSTN numbers available for use by the call manager may be provided by the operator of the PSTN network 112.

Other variations are possible.

While this invention has been particularly shown and described with reference to preferred embodiments, it will be understood to those skilled in the art that various changes in form and detail may be made without departing from the scope of the invention as defined by the claims.

What is claimed is:

1. A method of establishing a communication event in a communication system from an initiator device to one of a plurality of entities comprising:
   receiving a calling identity assigned to at least one of said entities and contact information for the at least one of said entities at a first network node associated with a packet switched network, wherein the first network node is arranged to communicate with a packet switched communication system on behalf of the initiator device;
   causing a communication event to be initiated from the initiator device to the at least one of said entities via a circuit switched network by:
      receiving an indication of a user selection at the initiator device of a link associated with the calling identity;
      responsive to receiving the indication, causing a PSTN number associated with the calling identity to be dialed at the initiator device;
      transmitting the calling identity assigned to the at least one of said entities to a gateway node;
   routing a circuit-switched communication event from the initiator device to the at least one of said entities via the gateway node and a circuit switched network using the contact information without said circuit-switched communication event being routed via said first network node; and
   routing a packet-switched user messaging event from the initiator device to the at least one of said entities using the contact information and via said first network node.

2. A method as claimed in claim 1 wherein the first network node is a node executing at least one communication instance for transferring said assigned identity to the initiator device.

3. A method as claimed in claim 1 wherein the initiator device is a mobile device executing a client program for supplying a user interface to a user for selecting one of said entities.

4. A method as claimed in claim 1 wherein an identifier for the initiator device is stored in association with the associated contact information for the entity and the calling identity assigned to the entity.

5. A method as claimed in claim 1 wherein the associated contact information for the entity defines at least one location in one or more of the circuit switched network or a packet switched network.

6. A method as claimed in claim 5 wherein the associated contact information comprises at least one of a destination address for a receiving device, a PSTN number, a username or a VoIP device.

7. A method as claimed in claim 1 wherein the circuit switched communication event is an audio call.

8. A method as claimed in claim 1 wherein the circuit switched communication event is a video call.

9. A method as claimed in claim 1 wherein the calling identity is a PSTN number.

10. A method as claimed in claim 1, wherein the circuit switched communication event comprises a circuit switched call routed to the at least one of said entities via a circuit switched connection to the at least one of said entities.

11. A method as claimed in claim 1, wherein the packet switched user messaging event comprises one or more of chat data or instant messaging data.

12. A system comprising:
   one or more processors; and
   a computer-readable storage device storing computer-executable instructions that are executable by the one or more processors to cause the system to perform operations including:
      receiving a calling identity assigned to an entity and contact information for the entity at a first network node associated with a packet switched network, wherein the first network node is arranged to communicate with a packet switched communication system on behalf of an initiator device;
      causing a communication event to be initiated from the initiator device to the entity via a circuit switched network by:

receiving an indication of a user selection at the initiator device of a link associated with the calling identity;

responsive to receiving the indication, causing a PSTN number associated with the calling identity to be dialed at the initiator device;

transmitting the calling identity assigned to the entity to a gateway node;

routing a circuit-switched communication event from the initiator device to the entity via the gateway node and a circuit switched network using the contact information without said circuit-switched communication event being routed via said first network node; and routing a packet-switched user messaging event from the initiator device to the entity using the contact information and via said first network node.

13. A system as claimed in claim 12 wherein the associated contact information for the entity defines at least one location in one or more of the circuit switched network or a packet switched network.

14. A system as claimed in claim 12 wherein the associated contact information comprises at least one of a destination address for a receiving device, a PSTN number, a username or a VoIP device.

15. A system as claimed in claim 12 wherein the circuit switched communication event includes an audio call.

16. A system as claimed in claim 12 wherein the circuit switched communication event includes a video call.

17. A system as claimed in claim 12 wherein the calling identity includes a PSTN number.

18. A computer-readable storage device storing computer-executable instructions that are executable by at least one computing device to cause the at least one computing device to perform operations comprising:

receiving a calling identity assigned to an entity and contact information for the entity at a first network node associated with a packet switched network, wherein the first network node is arranged to communicate with a packet switched communication system on behalf of an initiator device;

causing a communication event to be initiated from the initiator device to the entity via a circuit switched network by:

receiving an indication of a user selection at the initiator device of a link associated with the calling identity;

responsive to receiving the indication, causing a PSTN number associated with the calling identity to be dialed at the initiator device;

transmitting the calling identity assigned to the entity to a gateway node;

routing a circuit-switched communication event from the initiator device to the entity via the gateway node and a circuit switched network using the contact information without said circuit-switched communication event being routed via said first network node; and routing a packet-switched user messaging event from the initiator device to the entity using the contact information and via said first network node.

19. A computer-readable storage device as recited in claim 18 wherein the contact information comprises at least one of a destination address for a receiving device, a PSTN number, a username or a VoIP device.

20. A computer-readable storage device as recited in claim 18 wherein the circuit switched communication event includes a video call.

* * * * *